United States Patent
Landry (10) Patent No.: US 7,472,234 B2
(45) Date of Patent: Dec. 30, 2008

(54) METHOD AND SYSTEM FOR REDUCING LATENCY

(75) Inventor: Robin Joel Landry, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 300 days.

(21) Appl. No.: 11/362,729

(22) Filed: Feb. 28, 2006

(65) Prior Publication Data

US 2007/0204113 A1   Aug. 30, 2007

(51) Int. Cl.
*G06F 12/00* (2006.01)

(52) U.S. Cl. .................. 711/147; 711/167; 709/212
(58) Field of Classification Search .............. 711/154, 711/141, 147
See application file for complete search history.

*Primary Examiner*—Kevin Ellis
*Assistant Examiner*—Hashem Farrokh
(74) *Attorney, Agent, or Firm*—MH2 Technology Law Group LLP (57) ABSTRACT

Embodiments generally relate to a method of reducing latency and cost. A device access request is received in a memory of non-local node over a NUMA interconnect from a source node. The device access request is forwarded to an off-node controller from the memory of the non-local node. The device access request completion notification and data is forwarded to the source node.

15 Claims, 6 Drawing Sheets

METHOD AND SYSTEM FOR REDUCING LATENCY

FIELD

This invention relates generally to reducing latency and costs. More particularly, embodiments relate to reducing latency and hardware costs in a multi-node system.

DESCRIPTION OF THE RELATED ART

Multi-node systems are available for purchase and use. For example, Orion Multisystems, Inc. is producing a 96-node computer workstation. Each node includes a processor, a memory controller (within the processor), a peripheral component interconnect (PCI) bridge, and a network card. The nodes are powered by a power network and the nodes may communicate with one another over a network interconnect.

Each processor within a node generally interfaces with some type of cache memory. Each processor may also communicate over an internal network fabric (e.g., Gigabit Ethernet network fabric by Orion Multisystems, Inc.) or a system interconnect (e.g., Fireplane™ by Sun Microsystems, Inc.) with other processors.

Figure 5:
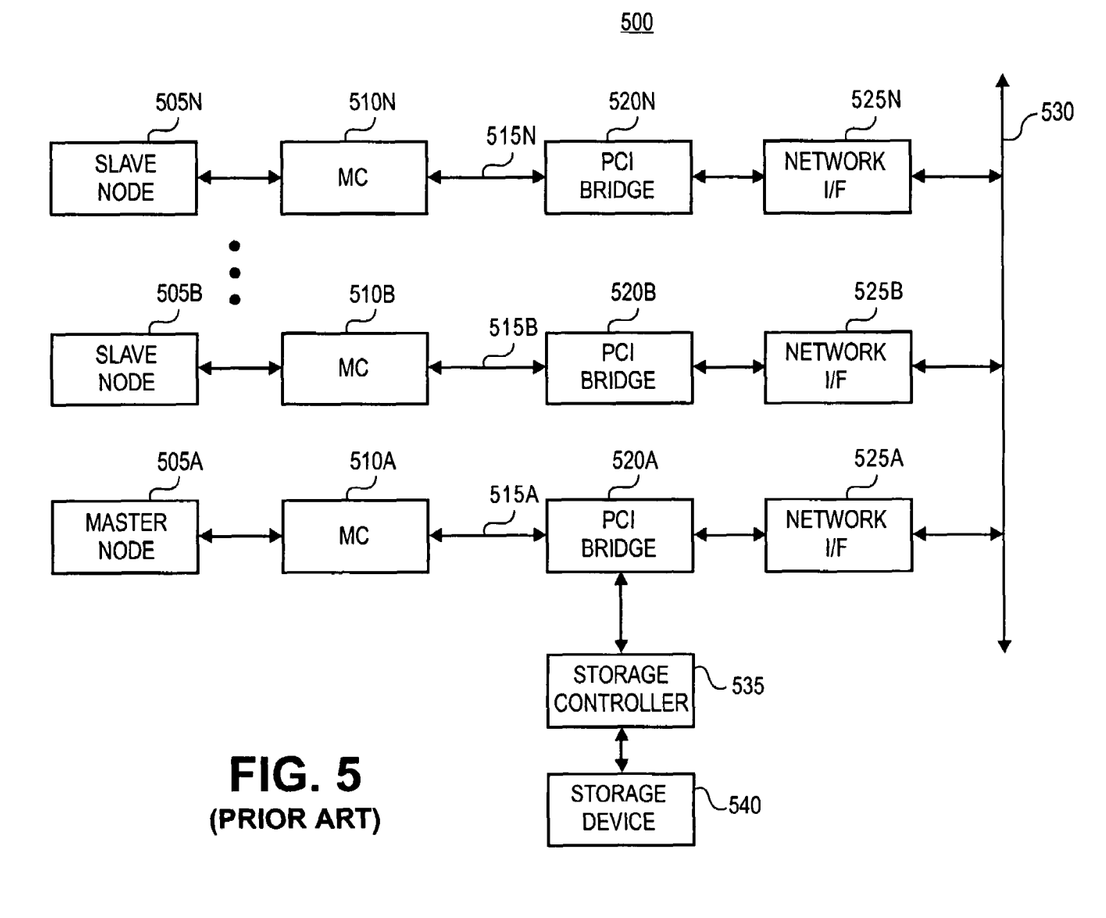
FIG. 5 illustrates a conventional multi-node system.

Although powerful and relatively inexpensive, a multi-node system still has drawbacks and disadvantages in its performance. For example, off-node memory accesses may be a performance bottleneck for the multiprocessor system, where off-node memory accesses are accesses to disk drives, network drives or similar devices co-located at a remote node. More particularly, a memory access has to typically traverse a hierarchy of buses, networks and/or bridges. FIG. 5 illustrates a representative portion (i.e., a cluster) of a multi-node system 500. As shown in FIG. 5, the system 500 may include nodes 505A-N. Each node 505 may interface with a memory controller 510A-N. Each memory controller 510 may also interface with a high speed microprocessor bus 515 (e.g., Hyper Transport) a high speed memory (not shown). The high-speed memory may be used for an instance of the operating system and may also provide memory space for the data and for executing applications.

The microprocessor bus 515 may also be interfaced with with peripheral component interconnect ("PCI") bridges 520A-N. The PCI bridges 520 may serve as interfaces to transfer data between the microprocessor bus 515 and a network interface 525, which is interfaced with the system node interconnect 530. In some configurations, each node 505 may be required to have a PCI bridge 520 and a 100 Mb/s, 1 Gb/s, or 10 Gb/s network interconnect, where the cost of the network components is the penalty for the increased speed. The PCI bridge 520A may also interface with a storage controller 535. The storage controller 535 may control the read/write accesses to the storage device 540. The storage device 540 may be implemented using a disk, an array of disks or other similar types of storage.

For a single write using a Network File System ("NFS") method, node 505B may construct a write message to the storage device 540. The node 505B may transfer the write message to a master node 505A, which is configured to control the storage device 540. As such, the write message may traverse from the node 505B to the memory controller 510b over the hyper transport bus 515B to the PCI bridge 520B. The PCI bridge 520B may forward the write message to the network fabric 530 through the network interface 525B. The master node 505A then receives the write message after the write message traverse network fabric 530, network interface 525A, PCI bridge 520a, microprocessor bus 515A, and memory controller 510A. The master node 505A may process the write message and send the write message to the storage device 540 via the memory controller 510A, hyper transport bus 515A, and the PCI bridge 520A. Accordingly, a node accessing a storage device may invoke a considerable amount of overhead in traversing the components of the multi-node system.

SUMMARY

An embodiment generally relates to a method of improving latency. The method includes receiving a device access request in a memory of non-local node over a NUMA interconnect from a source node. The method also includes forwarding the device access request to an off-node controller from the memory of the non-local node and forwarding a device access request completion notification to the source node.

Another embodiment generally pertains to a multi-node system. A multi-node system includes a plurality of nodes. Each node includes at least one processor, a cache memory configured to interface with the least one processor, and a memory controller configured to interface with the at least one processor and the cache memory. The memory controller is configured with non-uniformed memory access (NUMA) interconnects. The multi-node system also includes a master node selected from the plurality of nodes. The master node further includes an off-node controller and off-node device, where the master node is configured to forward a device access request received at a cache memory of the master node over the NUMA interconnects to the off-node controller.

Yet another embodiment generally relates to a method of reducing latency. The method includes modifying a BIOS of a symmetric multi-node system to support non-uniform memory access and reserving a plurality of buffers in a local memory of a node, each buffer allocated for a non-local node. The method also includes receiving information in a respective buffer of a selected non-local node over NUMA interconnects and transferring the received information from the respective buffer to an off-node controller.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. One of ordinary skill in the art, however, would readily recognize that the same principles are equally applicable to, and can be implemented in, all types of multinode systems, and that any such variations do not depart from the true spirit and scope of the present invention. Moreover, in the following detailed description, references are made to the accompanying figures, which illustrate specific embodiments. Electrical, mechanical, logical, and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to a method and system for reducing latency and hardware costs in a multi-node non-uniformed memory access (NUMA) system. More particularly, a processor in a local node may access a storage device (or network interface) of a remote node without traversing the bus hierarchy of a conventional multi-node system.

A local node may include at least one local processor, at least one cache memory (or local memory), and a memory controller, which is interfaced with the local processor and a high-speed processor bus (e.g., HyperTransport, Infiniband, etc.). The processor bus may also interface with a bridge device (e.g., peripheral component interface). The local processor may be configured to access the local cache memory as well as reserved buffers in cache memories of processors in remote nodes.

A group or a cluster of nodes may be formed in the multi-node NUMA system. A master (or remote) node may be designated and include the component devices of a local node. This master node may also include an off-node controller and associated off-node device. The off-node device may be a storage controller, a network interface, video card or other peripheral type of devices interfaced with the bridge device in some embodiments, hence the device being "off-node". If the off-node device is a storage controller, the storage controller may also interface with a magnetic disk drive, an array of disk drives or similar devices. If the off-node device is a network interface, the network interface may interface with local area, wide area, or combinations thereof networks. The master node further includes at least one cache memory, where reserved off-node buffers may be created, each reserved off-node buffer assigned to a respective local processor. Alternatively, in some embodiments, the cache memory of the master node may be configured to be shared by the other processors.

Accordingly, a processor may be configured to access the off-node device at the master node through a remote node driver. More particularly, a local processor may utilize its NUMA interconnects to write to its off-node buffer in the cache memory of the master node. The remote node driver may be configured to monitor the off-node buffers for off-node accesses by the local processors, where the off-node access may be a device access request (e.g., disk write, disk read, transmit packet, etc.). The remote node driver executing by the master processor may process forward the device access request from the cache memory to the off-node controller for processing (e.g., either writing to a disk drive, forwarding a message, etc.) The remote node driver may retrieve data (e.g., data from a disk drive, an incoming message packet, etc.) from the off-node device and store the data in an area for the designated local processor.

In other embodiments, the multi-node system may be a symmetric multiprocessor ("SMP") system. The existing basic input/output software ("BIOS") of the SMP system may be modified to support embodiments of the remote node driver. More particularly, the BIOS may be configured to individually boot each CPU of each node in the multinode system or the BIOS may boot a group of CPUs while providing BIOS services to each processor instead of the boot processor as with conventional systems. Moreover, the BIOS may also be configured to reserve buffer space that processors may access as well as the remote node driver. In some embodiments, a separate BIOS may be provided to each node because each node is physically configured like a conventional system. Accordingly, individual nodes in an SMP environment may be reconfigured for independent operation.

Figure 1A:
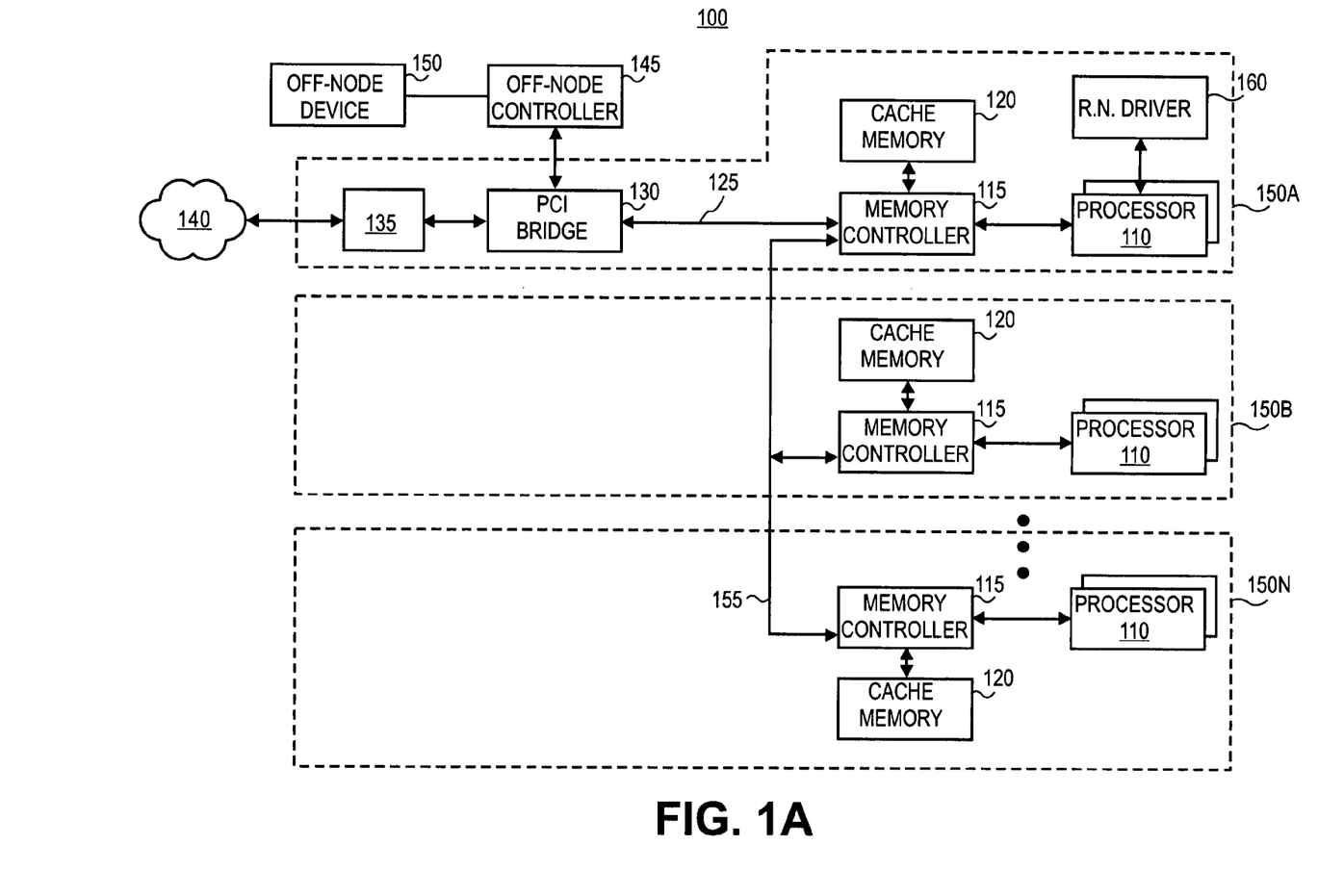
FIG. 1A illustrates a block diagram of a portion of an exemplary system where an embodiment may be practiced.

FIG. 1A illustrates a block diagram of a cluster of nodes 100 an exemplary multi-node system where an embodiment may be practiced. It should be readily apparent to those of ordinary skill in the art that the cluster of nodes 100 depicted in FIG. 1 represents a generalized schematic illustration and that other components may be added or existing components may be removed or modified. Moreover, the cluster of nodes 100 may be implemented using software components, hardware components, or combinations thereof.

As shown in FIG. 1, the cluster of nodes 100 may include nodes 105A-N. Each node may include at least one processor 110, which is interfaced with a memory controller 115. The processors 110 may be implemented with appropriate processors from companies such as Intel, Advanced Micro Devices, Transmeta, and other similar companies. The processors 110 may execute a multi-node processor operating system, such as Linux, Unix, or other similar multi-tasking operating systems.

The memory controller 115 may be configured to provide a mechanism to access to the cache memory 120 as well as off-node devices. More particularly, the memory controller 115 may be configured to determine whether a requested device access request (e.g., memory read or write) is for the local cache memory 120 or remote cache memory for the remote node driver to forward to the off-node device. The cache memory 120 may be implemented as a form of non-persistent storage (e.g., dynamic random access memory ("RAM"), static RAM, etc.). In some embodiments, the memory controller 115 may be embedded in the processor 110.

For this illustrative example, node 105A may be designated the master node. As the master node, the memory controller of node 105A may also be interfaced with a PCI bridge 130. The PCI bridge 130 may be configured to provide an input/output hub for the node 105A.

In some embodiments, the PCI bridge 130 may also interface with a network interface 135. The network interface 135 may then interface with a network 140. The network 140 may be configured to provide a communication channel between the system 100 and other network devices. The network 140 may be implemented as a local area network, wide area network, Internet, or combinations thereof.

As shown in FIG. 1A, the PCI bridge 130 may be further interfaced with an off-node device controller 145 with an associated off-node device 150. For example, some embodiments may implement a storage controller, a network interface or a combinations thereof as the off-node device controller. In other embodiments, the off-node controller may be an ATM network interface, an input/output controller (for sound, video, printer, scanner, etc.), or other bus adapter (universal serial bus or IEEE1394). In yet other embodiments, the PCI bridge may be an alternate bus such as AGP, PCI Express or PCI-X.

Returning to within a node (i.e., node 105A), local processor 110 may communicate with other processors (destination, remote, etc.) using its NUMA interconnects to transfer data and/or commands to the respective cache memory of the destination processor. In some embodiments, the NUMA interconnects 155 may be configured to provide direct communication links between the processors 110. In other embodiments, the NUMA interconnects 155 may be part of the microprocessor bus 125. NUMA interconnects are well known in the art and the various implementations schemes of NUMA are well within the scope of these embodiments.

Accordingly, a processor in a local node may transfer data and/or commands (e.g., device access request) over the NUMA interconnects 155 to other cache memories of selected processors. In some embodiments, a processor at a source node may transfer device access requests for an off-node device to a reserved off-node buffer in the cache memory 120 of a master node, for example, node 105A.

An embodiment of a remote node driver 160 may be executing at a processor in the master node 105A. More specifically, the remote node driver 160 may be configured to monitor the off-node buffers for incoming device access requests placed by the other nodes. For instance, a disk write may be placed in a reserved off-node buffer in the cache memory 120 of the master node 105A by node 105B. The remote node driver 160 may then transfer the device access requests from the off-node buffer to the off-node device controller, i.e., the storage controller 145 in FIG. 1B. The remote node driver 160 in node 105a may transfer the received device access requests from its cache memory to the off-node controller 145.

If direct memory access (DMA) support is enabled at the node 105a, the DMA control functions of the memory controller 115 may control the transfer of the received device access requests from the cache memory to the off-node controller 145. Subsequently, once the data/command are received by the off-node controller 145, they are processed appropriately.

Figure 1B:
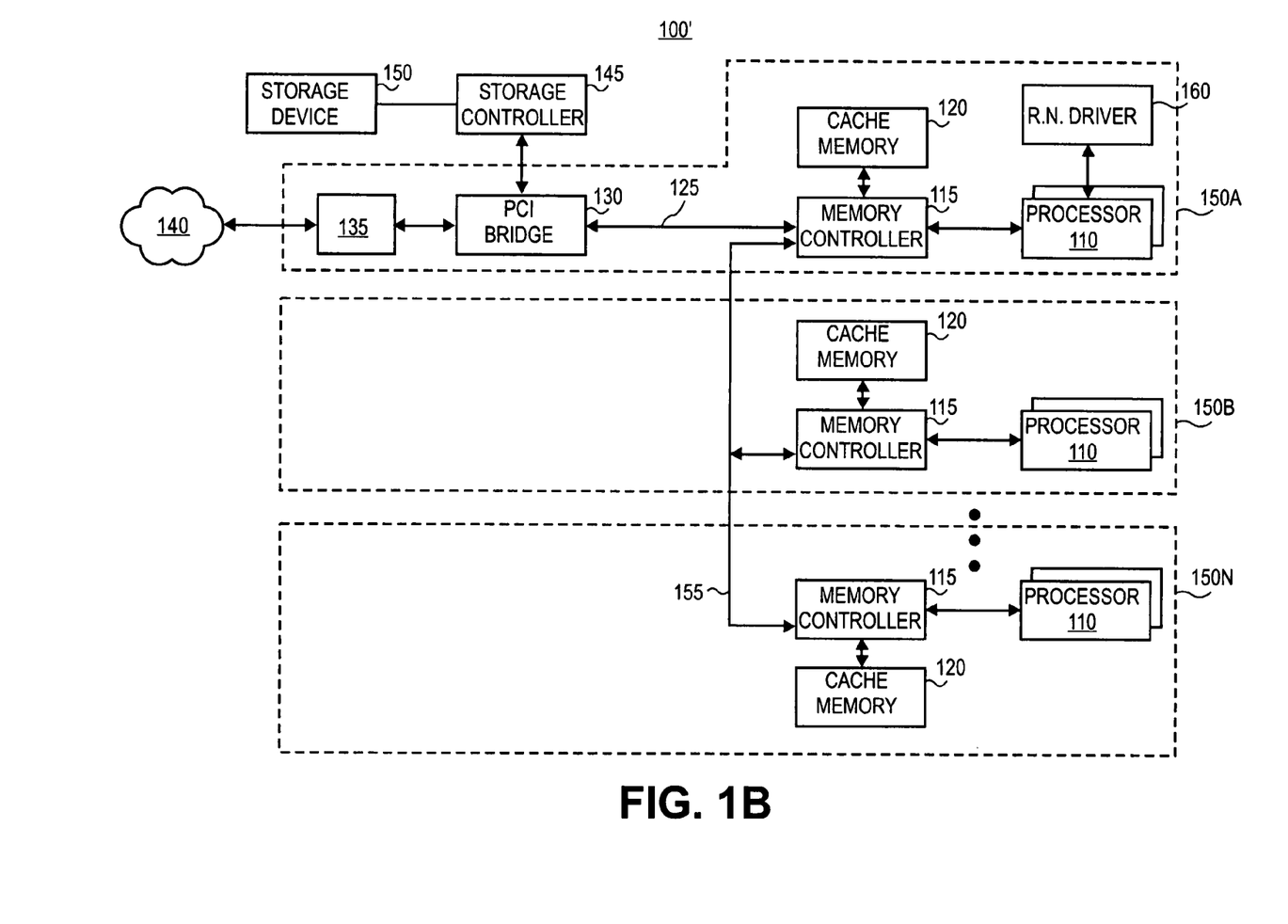
FIG. 1B Illustrates a block diagram of a portion of another exemplary system, where another embodiment may be practiced.

FIG. 1B illustrates a block diagram of another embodiment. More particular, system 100' is identical to the system 100 of FIG. 1A except for the off-node controller 145 and off-node device 150. In FIG. 1B, the off-node controller is a storage controller 145 and the off-node device is a storage device 150. The operation of system 100' of FIG. 1B may be identical to the system 100 of FIG. 1B except that the processors may be issuing storage access requests to the master node.

Figure 2:
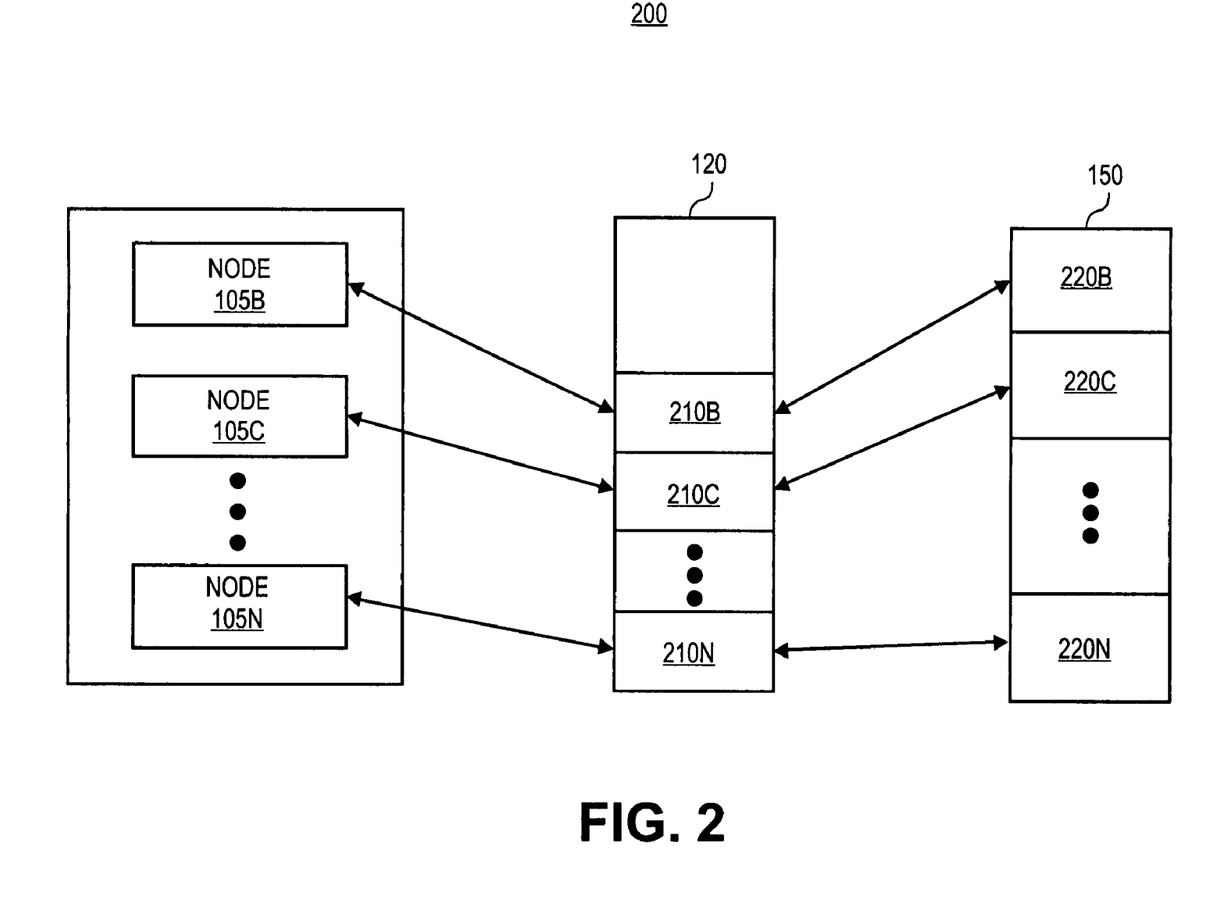
FIG. 2 illustrates a memory allocation diagram where another embodiment may be practiced.

FIG. 2 illustrates a block diagram of a memory map 200 for the remote node and several local nodes for the embodiment shown in FIG. 1B. It should be readily apparent to those of ordinary skill in the art that the memory map 200 depicted in FIG. 2 represents a generalized schematic illustration and that other components may be added or existing components may be removed or modified.

As shown in FIG. 2, memory map 200 may include the cache memory 120 of the master node 105a. The cache memory 120 may be configured to provide memory space for the execution of applications and the operating system being executed by the associated processor of the master node 105A. The address space of cache memory 120 may be partitioned into off-node buffers 210B-N. Each off-node buffer 210 may be associated with a respective processor 110B-N. That is, the respective processor 110 in each node 105B-N may access its off-node buffer by using its respective NUMA interconnects. Each off-node buffer 210 may be configured to act as buffer between the respective processor 110 and the off-node device 150.

The memory map 200 also includes a depiction of the storage space 215 associated with the storage device 150. Similar to the cache memory 120 of the remote node 105a, the storage space 215 of the storage device 150 may be partitioned into segments (or partitions) 220B-N. In some embodiments, each processor 110 of the associated nodes 05 may be allocated a space within the storage device 150. Each storage partition 220 may be associated with a respective off-node buffer 210. In other embodiments, storage device 150 may be shared (or unified) space for the associated nodes. Thus, some embodiments of the remote-node driver manage the data flow between the respective partition 220 and the storage device 135 and the associated off-node buffer 210.

Accordingly, a processor 110 of a local node 105B may issue a write access or read access to its respective off-node storage through its respective off-node buffer 210. More particularly, the processor 110 may use its NUMA interconnects to transfer the read/write access to its reserved off-node buffer 210B. The remote node driver 160 may detect the arrival of the read/write access in the off-node buffer 210B. The remote node driver 160 initiate the transfer from the off-node buffer 210B to the associated storage space 220B in the storage device 150. In some embodiments, DMA may be enabled. As such, the remote node driver 160 may use DMA techniques to transfer the read/write access from the cache memory to the storage controller 145 using the pathway of the memory controller 115, the microprocessor bus 125 and the PCI bridge 130. Accordingly, the latency of read or write commands is reduced by this method because the commands do not proceed over the PCI bridges, the network fabric, and various interfaces saves to the off-node device.

Figure 3:
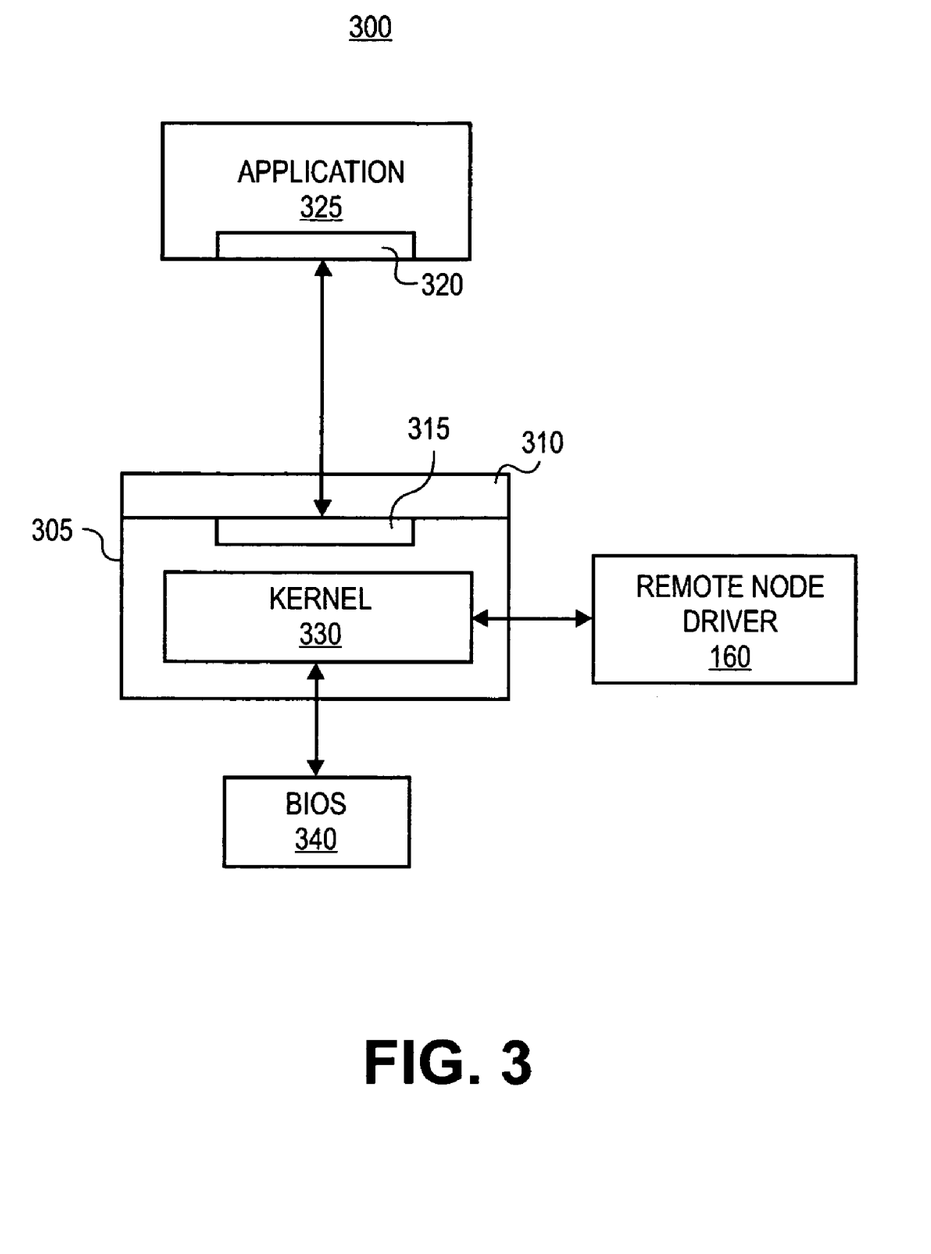
FIG. 3 illustrates an exemplary architecture in accordance with yet another embodiment.

FIG. 3 illustrates an exemplary diagram of a software environment 300 where an embodiment may be practiced. It should be readily apparent to those of ordinary skill in the art that the environment 300 depicted in FIG. 3 represents a generalized schematic illustration and that other components may be added or existing components may be removed or modified.

As shown in FIG. 3, the software environment 300 may include an operating system 305 and may execute on each of the processors 110 in the system 100. The operating system 305 may be a version of a LINUX™, UNIX™, or similar multi-tasking operating system configured to operate in a multi-node system. A run-time environment 310 may be configured to execute on the operating system 305. The run-time environment 310 may provide a set of software that supports the execution of applications/programs. The run-time environment 310 may include an application program interface ("API") 315 and a complementary API 320 within an application 325. The API 315 may be configured to provide a set of routines that the application 325 uses to request and carry out lower-level services performed by the operating system 305. The operating system 305 may include a kernel 330. The kernel 330 may be configured to provide secure access to the processor's 110 hardware and to various processes. The kernel 330 may also be configured to interface with device drivers such as a remote node driver 160 and a basic input/output system ("BIOS") 340. The BIOS 340 may be configured to initiate at startup of the processor 105 to configure devices attached to the processor 105 and to boot up the operating system 305. The BIOS 340 may also be configured to support NUMA accesses as well as off-node buffers.

The remote node driver 160 may be configured to implement the functionality associated with embodiments of the invention. More particularly, the remote node driver 160 executing on a processor in the master node may be configured to provide access to the reserved address space in the cache memory of the master node for a local processors and subsequently, to a storage device. In other embodiments, the local processors may access a network through a network adapter.

Figure 4:
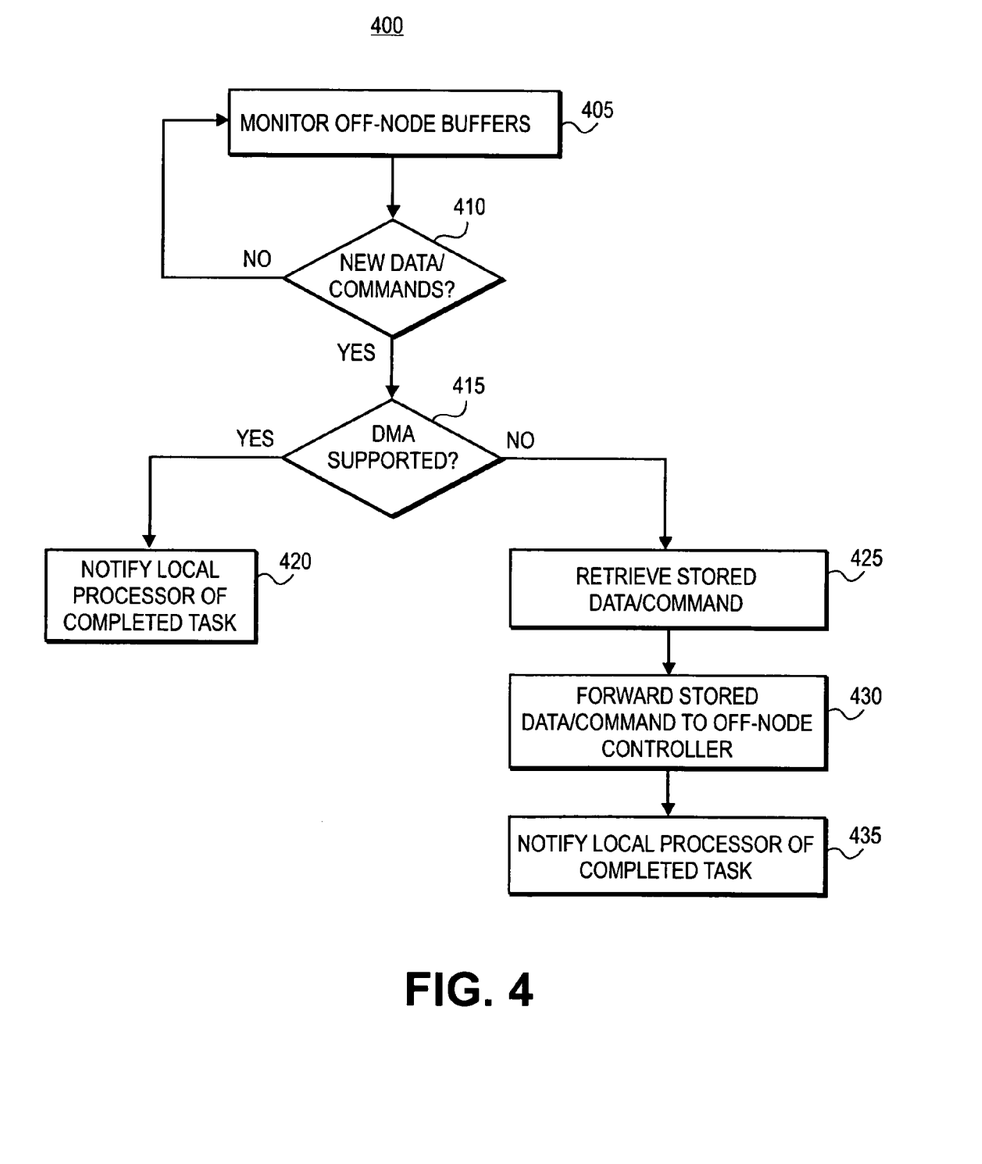
FIG. 4 illustrates a flow diagram implemented by yet another embodiment.

FIG. 4 illustrates a flow diagram 400 implemented by yet another embodiment. It should be readily apparent to those of ordinary skill in the art that the flow diagram 400 depicted in FIG. 4 represents a generalized schematic illustration and that other steps may be added or existing steps may be removed or modified.

As shown in FIG. 4, the remote node driver 160 may be configured to monitor the off-node buffers for data and/or commands from associated processors, in step 405. More particularly, the remote node driver 160 may monitor for interrupts that may be triggered when device access request has been written. In some embodiments, the remote node driver 160 may monitor the memory controller for addresses that are associated with the off-node buffers.

In step 410, the remote node driver 160 may determine whether a new device access request has been received. If the monitored off-node buffers are empty, the remote node driver 160 may return to the activity of step 405. Otherwise, the remote node driver 160 may determine whether DMA has been enabled for this master node, in step 415.

If DMA support has been enabled, the remote node driver 160 may be configured to notify the local initiating processor that the device access request was completed. When DMA is enabled, the DMA initiates the transfer of the received device access request from the off-node buffer to off-node controller over the PCI bridge 130.

Otherwise, if the DMA is not supported, the remote node driver 160 may issue a command to the processor 110 of the master node 110 to the memory controller 115 to transfer the received device access request to the off-node controller, in step 425.

In step 430, the memory controller 115 may transfer the received device access request from the off-node buffer to the PCI bridge 130 over the microprocessor bus 125. The PCI bridge 130 may be configured to forward the received device access request to the off-node controller. When the off-node controller completes its processing, the off-node controller may use the BIOS services to return a signal that the task was completed to the remote node driver 160, in step 435.

Certain embodiments may be performed as a computer program. The computer program may exist in a variety of forms both active and inactive. For example, the computer program can exist as software program(s) comprised of program instructions in source code, object code, executable code, or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of reducing latency, the method comprising:
reserving a plurality of buffers in a memory of a non-local node, each buffer associated with other non-local nodes;
receiving a device access request in the memory of the non-local node over a NUMA interconnect from another node;
forwarding the device access request to an off-node controller from the memory of the non-local node; and
forwarding a device access request completion notification to the another node.

2. The method of claim 1, further comprising allocating a plurality of partitions within the storage device, each partition associated with one of the buffers of the plurality of buffers.

3. The method of claim 1, further comprising processing the device access request at the off-node controller.

4. The method of claim 3, wherein the device access request is a disk access request and the off-node controller is a storage controller.

5. The method of claim 3, wherein the off-node controller is one of a network interface, a video card, an input/output controller, a universal serial bus port, IEEE1394 port, and a sound card.

6. A multi-node system, comprising;
a plurality of nodes, each node further comprising:
at least one processor;
a cache memory configured to interface with the least one processor;
a memory controller configured to interface with the at least one processor and the cache memory, wherein the memory controller is configured with non-uniformed memory access (NUMA) interconnects; and
a master node selected from the plurality of nodes, the master node further comprising an off-node controller and off-node device, wherein the master node is configured to forward a device access request received at a cache memory of the master node over the NUMA interconnects to the off-node controller, and wherein the cache memory of the master node is further configured to allocate a respective buffer for each node of a subset of the plurality of nodes.

7. The system of claim 6, further comprising a driver executing on the master node, wherein the driver is configured to transfer information to the off-node controller.

8. The system of claim 7, wherein the off-node controller is a storage controller and the off-node device is a storage device.

9. The system of claim 7, wherein the cache memory of the master node is further configured to allocate a respective buffer for each node of a subset of the plurality of nodes and each respective buffer is associated with a section of the storage space in the storage device.

10. The system of claim 9, wherein the reserved buffer may be associated with one section of the storage space in the storage device.

11. The system of claim 6, wherein the off-node controller is a network interface, a video card, an input/output control ler, a universal serial bus port, IEEE1394 port, and a sound card.

12. A method of reducing latency, the method comprising:
modifying a BIOS of a symmetric multi-node system to support non-uniform memory access;
reserving a plurality of buffers in a local memory of a node, each buffer allocated for a non-local node;
receiving information in a respective buffer of a selected non-local node over NUMA interconnects; and
transferring the received information from the respective buffer to an off-node controller.

13. The method of claim 12, further comprising:
writing data directly to tile respective buffer on tile local memory from tile selected non-local processor.

14. The method of claim 13, further comprising:
updating tile data to tile respective partition of tile selected non-local processor.

15. The method of claim 12, further comprising:
reading data directly from tile respective buffer on tile local memory by the selected non-local processor.

* * * * *